Nov. 5, 1968  J. LUBEY  3,409,716
METHOD OF MOLDING SHAPED REFRACTORY BODIES HAVING AN
ATTACHED SPACER OF NON-METALLIC SHEET MATERIAL
Filed July 6, 1966  4 Sheets-Sheet 1

INVENTOR.
JOSEF LUBEY
BY Kurt Kelman
AGENT

Nov. 5, 1968     J. LUBEY     3,409,716
METHOD OF MOLDING SHAPED REFRACTORY BODIES HAVING AN
ATTACHED SPACER OF NON-METALLIC SHEET MATERIAL
Filed July 6, 1966     4 Sheets-Sheet 2

INVENTOR.
JOSEF LUBEY
BY Kurt Kelman
AGENT

Nov. 5, 1968  J. LUBEY  3,409,716
METHOD OF MOLDING SHAPED REFRACTORY BODIES HAVING AN
ATTACHED SPACER OF NON-METALLIC SHEET MATERIAL
Filed July 6, 1966  4 Sheets-Sheet 3

INVENTOR.
JOSEF LUBEY
BY
Kurt Kelman
AGENT

Nov. 5, 1968  J. LUBEY  3,409,716
METHOD OF MOLDING SHAPED REFRACTORY BODIES HAVING AN
ATTACHED SPACER OF NON-METALLIC SHEET MATERIAL
Filed July 6, 1966  4 Sheets-Sheet 4

INVENTOR.
JOSEF LUBEY
BY Kurt Kelman
AGENT

United States Patent Office 3,409,716
Patented Nov. 5, 1968

3,409,716
METHOD OF MOLDING SHAPED REFRACTORY BODIES HAVING AN ATTACHED SPACER OF NON-METALLIC SHEET MATERIAL
Josef Lubey, Leoben, Styria, Austria, assignor to Veitscher Magnesitwerke-Actien-Gesellschaft, a corporation of Austria
Filed July 6, 1966, Ser. No. 563,244
Claims priority, application Austria, July 8, 1965, A 6,191/65
5 Claims. (Cl. 264—267)

ABSTRACT OF THE DISCLOSURE

An expendable spacer cover is co-molded with a refractory brick by placing the cover in a recess in the mold wall during molding, the molding pressure being exerted only over the cross section of the molding cavity while the cover is protected against buckling pressure in the recess.

---

This invention relates to shaped refractory bodies, hereinafter referred to as refractory bricks, and particularly to a method of molding refractory bricks having a spacer of non-metallic sheet material on at least one face thereof.

It is known to provide newly manufactured refractory bricks with covers of non-metallic, combustible or volatile sheet material, usually cardboard, on at least one face. When metallurgical furnaces are lined with the bricks, the covers constitute spacers which facilitate setting the bricks with the proper spacing between them. When the furnace lined with the new bricks is first heated, the combustible covers are burned out and provide gaps between the bricks for the growth and thermal expansion of the bricks which consist of chemically bonded refractory particles. Unless the bricks are suitably spaced, their useful life is sharply reduced.

According to one known method, sheets of cardboard or like non-metallic, combustible sheet material are placed between the bricks when the latter are set in the furnace lining. This method not only is time consuming, but it cannot be employed for suspended furnace arches or roofs, and the cardboard sheets tend to shift even in other portions of the furnace lining, thereby causing formation of gaps which may be irregular in width, too narrow where cardboard was lacking or too wide where two layers of cardboard were superposed.

An object of the invention is the provision of refractory bricks of the type described to which covers of cardboard or like combustible, non-metallic material are attached, thus permitting the bricks to be used for building suspended furnace roofs.

It is possible to attach sheets of cardboard to otherwise finished bricks, but this is inconvenient because the bricks are quite heavy and must be handled during the attaching of the sheets. It is also difficult to fasten the sheets to the rough and somewhat porous surfaces of the brick by adhesives or in any other manner.

Another object of the invention is the provision of a method which permits cardboard covers to be attached to refractory bricks during molding of the bricks somewhat in the manner in which sheet metal covered refractory bricks are molded.

It is known to produce sheet metal covered bricks by bending a piece of sheet metal into a U-shaped approximately conforming to the bottom and two side walls of a mold in which the brick is to be molded, then to fill the mold with refractory composition, cover the composition in the mold with another piece of sheet metal, and then to compress the contents of the mold by means of a plunger. A sheet-metal clad refractory brick is thus made in a single molding operation.

The method is not directly applicable to cardboard covered refractory bricks because of the much lower rigidity of the non-metallic material which tends to buckle under the pressure applied to the refractory composition by the plunger in a direction transverse to the smallest dimension of the cardboard sheet. Even when the non-metallic layer is adhered to sheet metal to produce a brick having a metal casing and additionally a cover of non-metallic spacer material, the latter tends to be deformed during the pressure stroke of the plunger and to interfere with proper adhesion of the metal casing to the refractory core.

Non-metallic sheet materials other than cardboard are not materially superior to the latter in their mechanical strength, and the problem of buckling and other deformation cannot be solved by the choice of another practical material.

The invention prevents buckling of a non-metallic sheet material inserted into the mold prior to molding of the refractory composition while the sheet material is being attached to the molded refractory body by the molding process itself, by providing the mold cavity with a shallow recess in one of its walls, the recess being open toward the mold cavity and coextensive with a portion of the latter in the direction of plunger movement. A piece of the non-metallic sheet material is placed in the recess whose dimensions are selected to permit the non-metallic piece to be entirely received in the recess. More specifically, the thickness of the sheet material must not be greater than the depth of the recess transversely of the direction of plunger movement. When the mold cavity is then filled to the required depth with refractory composition, and pressure is exerted on the latter by movement of a plunger inward of the mold cavity, the relatively weak non-metallic sheet is protected against stresses transverse to its thickness which might other wise cause buckling. The pressure converts the refractory composition into a shape-retaining body in a manner known in itself.

The non-metallic material, prior to its insertion into the mold, may be secured by adhesives, by rivets, or by mechanical interlocking to a sheet metal member to form a laminar plate therewith, the plate then being placed in the recess of the mold with the metallic layer facing through the open side of the recess toward the mold cavity proper.

The exact nature of this invention as well as other objects and advantages thereof will be readily apparent from consideration of the following specification relating to the annexed drawing in which.

Figure 12:
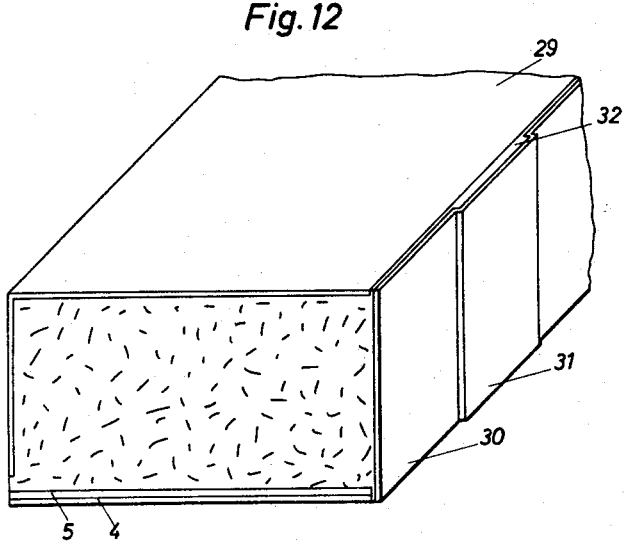
Figure 13:
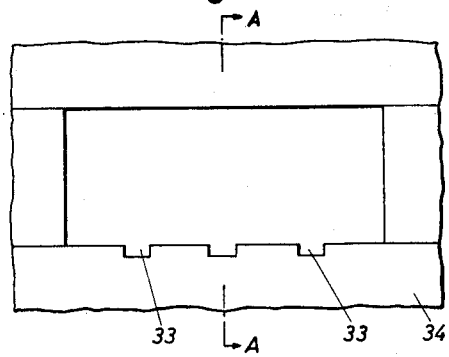
Figure 14:
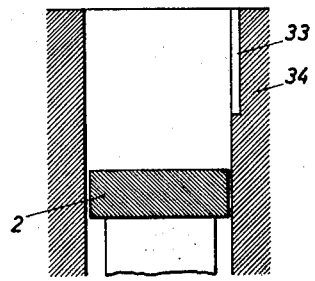

FIGS. 5 to 12 respectively show bricks molded according to the invention in perspective view toward the front face of the brick;

FIG. 13 is a plan view of a mold for making the brick of FIG. 12 on a reduced scale, the plunger and fixed closure of the mold having been omitted; and FIG. 14 shows the mold of FIG. 13 in section on the line A—A together with its plunger.

Figure 1:
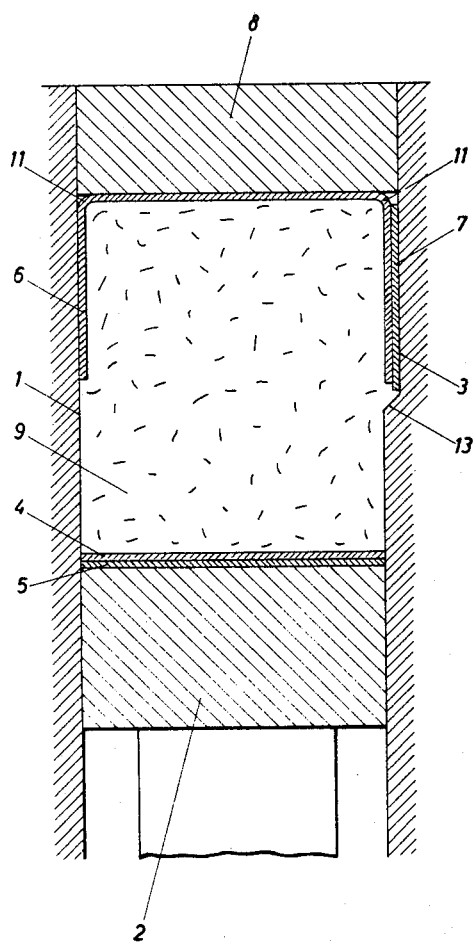
FIG. 1 illustrates a mold arrangement for making refractory bricks according to this invention, the view being in elevational section tranverse to the direction of elongation of the brick ultimately produced.

Referring now to the drawing in detail, and initially to FIG. 1, there is seen a mold 1 which defines a mold cavity of generally uniform rectangular cross section. The mold is assembled in a conventional manner from four heavy steel plates, as is evident from FIG. 13, the plates being secured to each other by non-illustrated clamps or by welds. The face of one of the plates in the mold cavity is formed with a machined beveled step 13 whereby a shallow recess 3 opens toward the mold cavity is formed.

The mold cavity is initially open in both vertical directions. When ready for molding, as shown in FIG. 1, the cavity is closed downwardly by a slidably inserted ram or plunger 2 whose horizontal cross section is substantially coextensive with that of the mold cavity. The horizontal face of the plunger 2 in the mold cavity is loosely covered with a cardboard sheet 5, about two millimeters thick and adhesively secured or riveted to a coextensive piece 4 of sheet metal, about 1 mm. thick. The cavity is substantially filled with granular refractory composition 9 of the following composition:

|  | Percent |
| --- | --- |
| Chromite, grain size 0–2 mm. | 30 |
| Sinter-magnesia, grain size 0–2 mm. | 50 |
| Sinter-magnesia, grain size 0–0.1 mm. | 20 |
| Sulfuric acid $H_2SO_4$ (density 25° Baumé) | +1.5 |
| Water | +2.5 |

The sinter-magnesia is of the following chemical analysis: 1.5% $SiO_2$, 6.5 $Fe_2O_3$, 0.5% $Al_2O_3$, 2.9% CaO, 88.6% MgO (by difference); the chromite having the analysis: 4.9% $SiO_2$, 13% FeO, 30% $Al_2O_3$, 0.3% CaO, 18% MgO, 32% $Cr_2O_3$, 0.9% ignition loss. Instead of that material there may be employed any other suitable basic refractory material, such as magnesia, magnesia-chrome or chrome-magnesia, the magnesia in all cases being dead-burned or electrically fused.

A U-shaped piece 6 of sheet metal extends horizontally over the top of the body of refractory composition, vertically along the recess 3 in which another piece 7 of cardboard is received and held in position by being adhesively fastened to the sheet metal, and vertically along the wall of the mold opposite the recess 3. The portion of the sheet metal piece 6 along the recess 3 extends farther downward than the opposite vertical portion. The bends 11 between the horizontal and vertical portions of the sheet metal piece 6 are rounded, and the piece fits loosely over the mold walls and the plug 8 which closes the top of the mold cavity and is fixedly held in place during the molding operation in a manner not further illustrated, for example, by the fixed platen of a press whose movable platen drives the plunger 2 inward of the mold cavity toward the position shown in FIG. 2.

Figure 2:
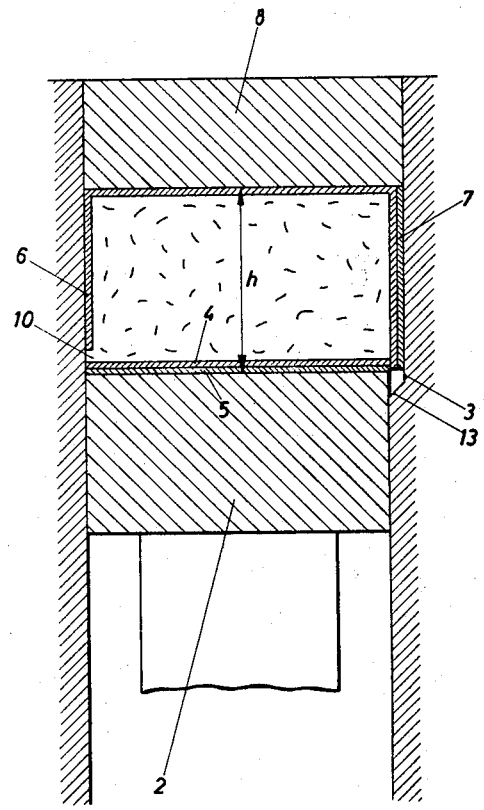
FIG. 2 shows the arrangement of FIG. 1 in a different operative position.

The mold arrangement shown in FIGS. 1 and 2 is operated as follows:

With the plug 8 removed, the plunger 2 is inserted in the mold 1 in the position shown in FIG. 1. The laminar assembly of a cardboard sheet 5 and a piece 4 of sheet metal is next placed on the plunger and is covered with the amount of loose refractory composition 9 required for molding the desired brick. The cardboard piece 7 is next inserted in the recess 3 when the U-shaped sheet metal member 6 is arranged over the refractory material. The plug 8 is fastened in position, and the plunger 2 is driven into the mold to a distance h from the face of the plug 8 in the mold cavity. At the resulting pressure, the composition 9 is converted into a shape-retaining body.

The pressure applied causes the sheet metal piece 6 to conform to the contour of the mold walls and to drive the piece of cardboard 7 into flat engagement with the bottom of the recess 3. The cardboard piece is protected against significant vertical stresses transverse to its thickness by the step 13, and cannot buckle.

In the terminal position of the plunger 2 shown in FIG. 2, the refractory composition 9 is compressed into a brick elongated transversely of the drawing plane. All longitudinal faces of the brick are encased into a sheet metal shell which is continuous except for a narrow gap 10, and the metal casing on two contiguous longitudinal faces of the brick is further covered by cardboard pieces 5, 7 which provide the desired combustible or volatile spacers.

Some deformation of the vertical sheet metal elements during pressing is unavoidable, and the dimensions of the U-shaped sheet metal member 6 prior to pressing are chosen accordingly. If the ultimate height h of the brick is 76 mm. (3 in.), the vertical length of the sheet metal portion extending along the recess 3 should be 79 mm., and the cardboard piece 7 is preferably attached to the sheet metal member 6 in such a manner that its edge projects over that of the metal a small distance, say 3 mm., in a vertical direction, as seen in FIG. 1. Good alignment of the cardboard cover 7 with the associated portion of the sheet metal member 6 is thereby achieved after molding, as is shown in FIG. 2.

Figure 3:
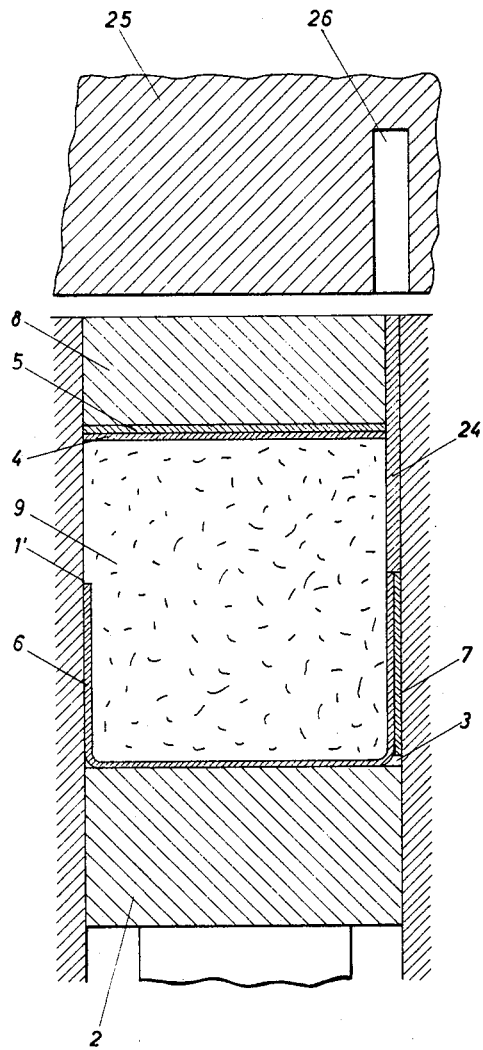
FIGS. 3 and 4 show a molding arrangement employing a modified mold in views corresponding to those of FIGS. 1 and 2 respectively.
Figure 4:
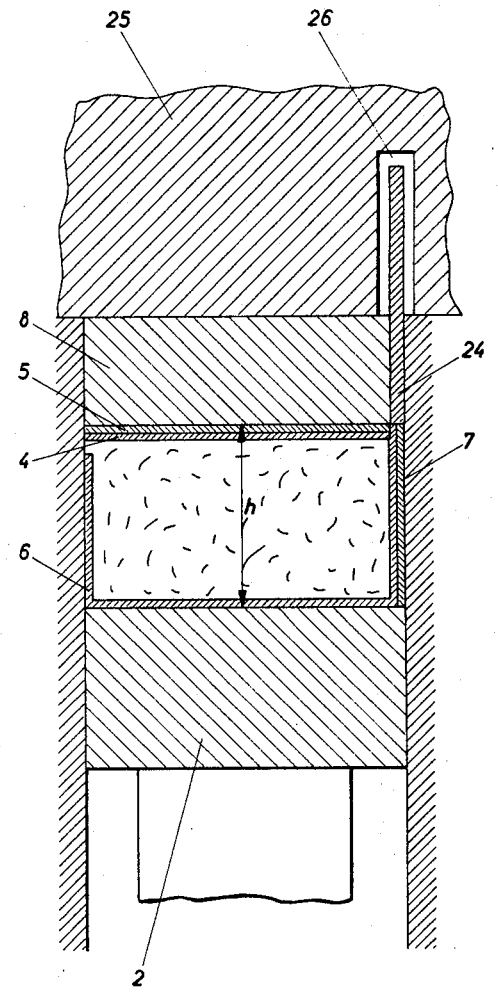

The modified mold arrangement illustrated in FIGS. 3 and 4 include a mold 1' assembled from steel plates none of which has a machined recess. A shallow recess 3 for receiving a cardboard spacer 7 is defined along one of the mold walls by the horizontal face of the plunger 2 and the narrow edge of a metal plate 24 which is guided for movement along one mold wall in guide grooves (not visible) in two other mold walls and by being partly received in a slot between the plug 8 and the one mold wall. A retaining plate for the plug 8 or fixed press platen 25 has a recess 26 aligned with the slot between the plug 8 and the wall of the mold 1' to permit unimpeded upward movement of the plate 24 when the plunger 2 moves inward of the mold cavity toward the position shown in FIG. 4.

In operating the modified arrangement of FIGS. 3 and 4, a U-shaped sheet metal member 6 having a cardboard piece 7 attached to one of its leg portions is placed on the plunger 2 in the position of the latter shown in FIG. 3. The plate 24 is inserted in the non-illustrated guide grooves until it rests on the narrow edges of the sheet metal member 6 and the cardboard spacer 7. The necessary amount of refractory composition 9 is placed in the mold cavity and covered by a sheet metal piece 4, a cardboard piece 5, and the plug 8, whereupon the retaining plate 25 is aligned with the mold assembly.

When the plunger 2 moves vertically upward, it displaces the cardboard spacer 7 along the mold wall while the plate 24 is pushed out of the mold cavity by the sheet metal member 6. Buckling of the cardboard piece 7 by frictional engagement with the wall is prevented by the pressure exerted horizontally on the overlying portion of the sheet metal member 6 by the compressed refractory composition 9.

Modifications of the molds shown in FIGS. 1 to 4 for applying to molded brick metal envelopes and cardboard covers others than those resulting from the aforedescribed methods will be readily apparent from consideration of the several bricks produced according to this invention and illustrated in FIGS. 5 to 11.

Figure 5:
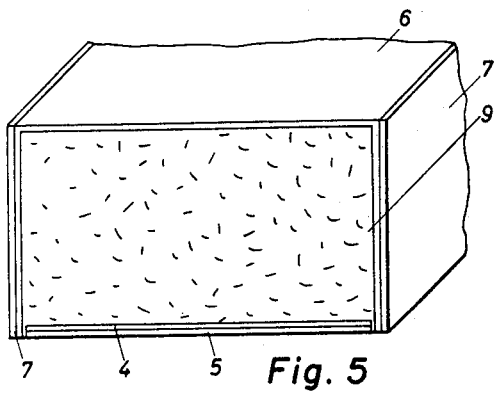

The brick shown in FIG. 5 differs from that produced in the molds of FIGS. 1 to 4 by having a cardboard cover 7 on each narrow longitudinal face. It is produced in a mold having recesses 3 or 3' in two opposite walls of the mold 1 or 1'.

Figure 6:
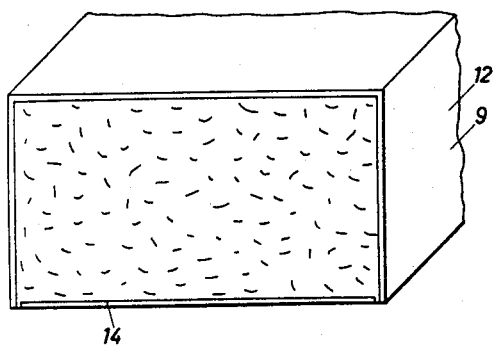

The same mold may be employed in an obvious manner for making the brick shown in FIG. 6 in which a U-shaped piece 12 of cardboard covers one wide longitudinal face and both narrow longitudinal faces, whereas the other wide longitudinal face is covered by a sheet metal piece 44.

It will be appreciated that cardboard elements to be attached directly to the surface of the refractory body are to be coated with an adhesive prior to insertion in the mold. The molding pressure provides an adhesive bond between the cardboard and the refractory material which is not readily available otherwise. When the cardboard is adhered to a metal member interposed between the cardboard and the refractory core of the brick, the metal is attached to the core by integral lugs projecting from the metal envelope into the loose composition prior to molding, and fastened therein by the hardening of the refractory material.

Figure 7:
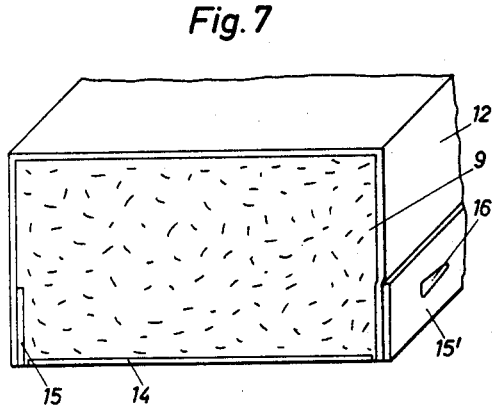

Such a lug, known in itself, is illustrated in FIG. 7 which shows a brick similar to that of FIG. 6 but provided with two identical narrow metal reinforcing strips 15, 15' at the edge portions of the narrow longitudinal brick faces adjacent the sheet metal piece 14. The sheet metal strip 15 is interposed between a portion of the cardboard cover 12 and the refractory composition 9 and is adhesively secured to the cover 12 while lugs 16 (not visible) extend into the refractory body. The other metal strip 15' is secured on the outside of the cardboard cover 12 by several lugs 16, only one being shown, and each extending through openings in the cover 12 into the refractory composition. The lugs 16 are triangular in shape and stamped out of the strips 15, 15' by a die which cuts two sides of the triangle, leaving the third side integrally attached.

Figure 8:
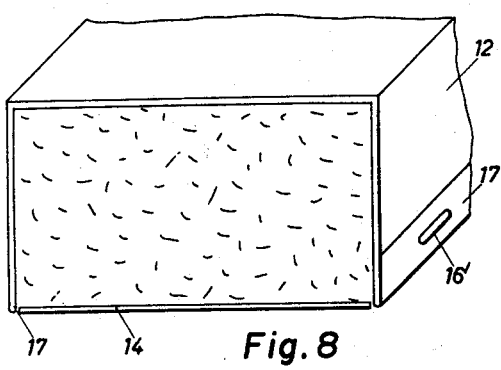

The modification of the brick of FIG. 6 shown in FIG. 8 has U-shaped strips 17 of very thin sheet metal slipped over the edges of the cardboard cover 12 for protecting the same. Elongated integral lugs 16' fasten the strips 17 to the cardboard cover 12 and to the refractory core of the brick.

Figure 9:
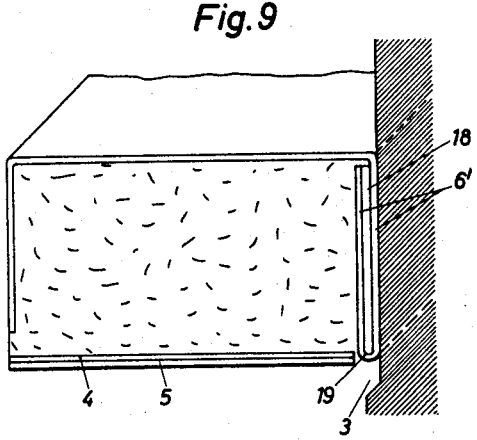

The brick illustrated in FIG. 9 is produced in the mold of FIGS. 1 and 2 of which a portion is also seen. One of the vertical legs of a U-shaped sheet metal member 6' is made long enough so that it may be folded back at 19 to form a pocket in which a cardboard spacer 18 may be received. The three-layered laminar structure consisting of two metal layers and an interposed non-metallic sheet layer is received in the recess 3 and thereby protected against vertical deforming stresses during movement of the plunger inward of the mold.

Figure 10:
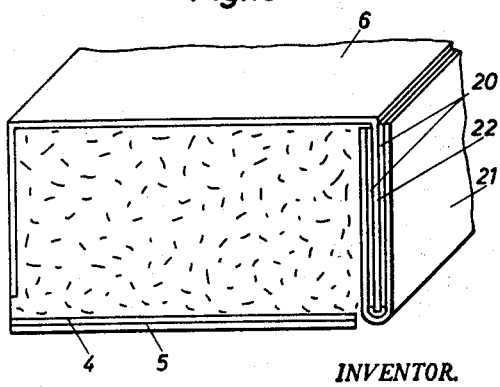

The brick of FIG. 10 differs from that shown in FIGS. 1–4 or 9 by a U-shaped sheet metal protector 21 whose inner opposite faces are covered with adhesively mounted cardboard sheets 20 which in turn receive one of the vertical legs 22 of the sheet metal member 6 therebetween. The resulting five-layered laminar structure is received in the recess 3 or 3' during the molding stroke of the plunger, and the bight portion of the sheet metal protector 21 is flush with the covers 4, 5 on a wide longitudinal face of the brick after molding.

Figure 11:
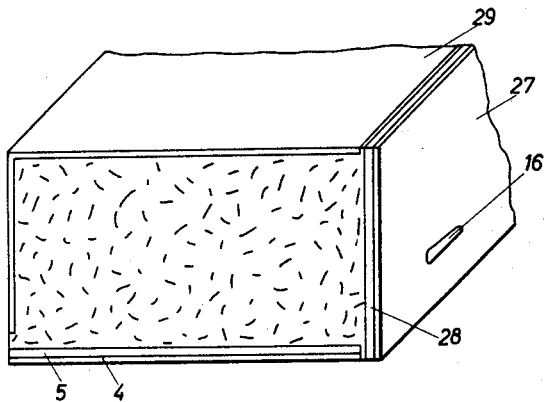

The brick shown in FIG. 11 differs from those described above by having a cardboard sheet 5 in direct contact with a wide longitudinal face of the refractory core and a sheet metal layer 4 placed thereover. Similarly, one of the narrow longitudinal faces of the refractory mateiral is in direct contact with a cardboard spacer 28 which is covered by a metal sheet 27 attached by a lug 16. An L-shaped metal piece 29 covers most of the remaining two longitudinal faces. A cardboard sheet may not be mounted between the refractory material and a unitary piece of sheet metal extending over more than one face of the brick. The resilient expansion of the cardboard after release from the mold would weaken the anchorage of the metal to the refractory core.

FIG. 12 illustrates a brick whose one narrow longitudinal face is covered by a piece 30 of sheet metal having three wide and hollow ribs 31 in each of which a spacer 32 of cardboard or cast thermosetting resin is received, only one rib 31 and the associated spacer 32 being seen in FIG. 12.

The mold 34 in which the brick of FIG. 12 is molded is shown in plan view and in elevational section in FIGS. 13 and 14. One of the four steel plates which jointly constitute the mold 34 has three machined grooves 33 which terminates at the top of the mold and whose length corresponds to the height of the brick to be produced. Each of the recesses 33 is dimensioned to receive a rib 31 and the spacer 32 fastened thereto. The sheet metal piece 30 thus extends over the entire length of the brick formed whereas the spacers 32 jointly cover only a fraction of the associated longitudinal face. Two other longitudinal faces are covered by an L-shaped metal piece 29 as in FIG. 11.

While the invention has been described with particular reference to specific embodiments, it is to be understood that it is not limited thereto, but is to be construed broadly and restricted solely by the scope of the appended claims.

What is claimed is:

1. A method of molding shaped refractory bodies having a cover of non-metallic sheet material completely over one face thereof, which comprises:
    (a) forming a mold with a cavity extending in a predetermined direction and having a substantially uniform cross section transverse of said direction, and with a shallow recess open toward said cavity in a direction transverse of said predetermined direction having at least the dimensions of said face;
    (b) placing a piece of said sheet material in said recess, the thickness of said sheet material in said transverse direction being not greater than the depth of said recess;
    (c) filling at least a portion of said cavity coextensive with said recess in said predetermined direction with a refractory composition adapted to cohere when compressed; and
    (d) exerting ram pressure on said refractory composition in said predetermined direction over the cross section of the cavity and until said composition is converted into a shape retaining body while said piece of sheet material is substantially protected against buckling in said recess.

2. A method as set forth in claim 1, wherein said piece of non-metallic sheet material is secured to a sheet metal member to form therewith a laminar member having a metallic layer and a non-metallic layer prior to the placing of said piece in said recess, said laminar member being placed in said recess, the metallic layer facing toward said cavity.

3. A method as set forth in claim 1, wherein a portion of said piece of non-metallic sheet material is secured, prior to being placed in said recess, to a sheet metal member to form therewith a laminar sheet structure having a metallic layer and a non-metallic layer, said laminar structure and the remainder of said piece of sheet material being placed in said recess, said metallic layer and an exposed surface of said remainder facing toward said cavity.

4. A method as set forth in claim 1, wherein the cross sections of the cavity in said predetermined and transverse directions are rectangular, said piece of sheet material is rectangular and of an area smaller than the rectangular cross section of the cavity in said transverse direction, and said pressure is exerted until the shape retaining body of refractory composition has one rectangular cross section generally coextensive with the rectangular area of the piece of sheet material.

5. A method as set forth in claim 1, wherein said piece of non-metallic sheet material is secured to one leg of a generally U-shaped sheet metal member to form therewith a laminar member having a metallic layer and a non-metallic layer, prior to the placing of said piece in said recess, said laminar member being placed in said recess with the metallic layer facing toward said cavity, the other leg of the U-shaped sheet metal member extending along a wall of the mold cavity opposite said recess, and the bottom of the U-shaped sheet metal member extending over said cavity in said transverse direction.

References Cited

UNITED STATES PATENTS 2,652,793  9/1953  Heuer et al. _____ 110—99

FOREIGN PATENTS 113,146  5/1941  Australia.
907,285  10/1962  Great Britain.
493,045  5/1953  Canada.

ROBERT F. WHITE, *Primary Examiner.*

K. J. HOVET, *Assistant Examiner.*